Nov. 4, 1941.　　A. R. LAUBENSTEIN　　2,261,771
SCREEN
Filed April 23, 1940　　2 Sheets-Sheet 1

WITNESSES
Geo. W. Naylor
A. L. Kitchin.

INVENTOR
Albert R. Laubenstein
BY
Munn, Anderson & Liddy
ATTORNEYS

Nov. 4, 1941.  A. R. LAUBENSTEIN  2,261,771.
SCREEN
Filed April 23, 1940   2 Sheets-Sheet 2
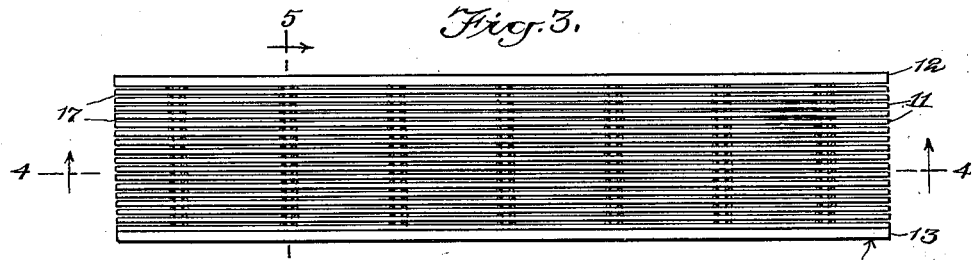
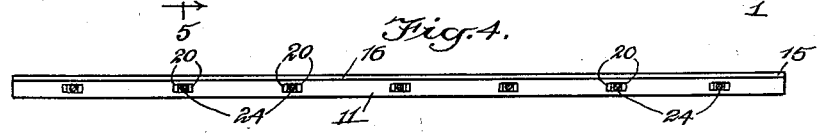
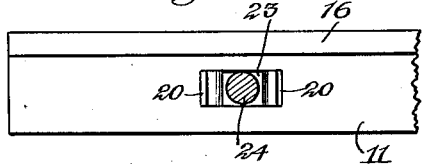
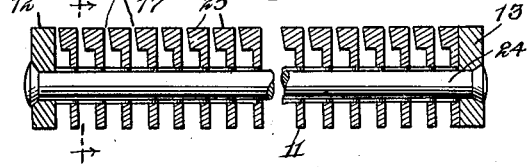
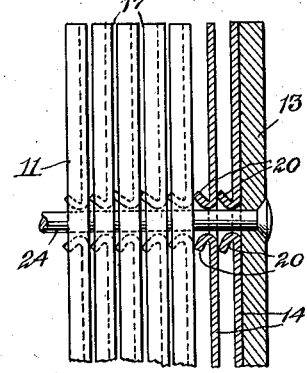
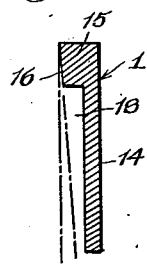
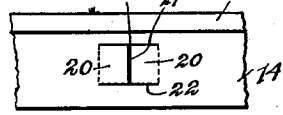
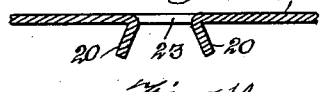
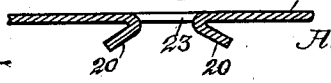
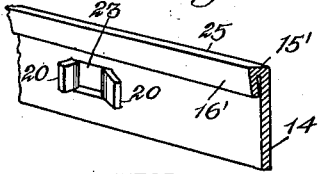
WITNESSES
INVENTOR
Albert R. Laubenstein
BY
ATTORNEYS Patented Nov. 4, 1941

2,261,771

UNITED STATES PATENT OFFICE 2,261,771

SCREEN

Albert R. Laubenstein, Ashland, Pa.

Application April 23, 1940, Serial No. 331,075

2 Claims. (Cl. 209—393)

This invention relates to screens and has for an object to provide an improved construction wherein the screen members may be readily adjusted to present desired openings.

Another object of the invention is to provide a screen structure wherein comparatively small openings are provided for screening water or fine material with a continuous screening action.

A further object more specifically is to provide a screen utilizing a plurality of substantially parallel bars with pressed-out portions for securing a proper spacing of the bars.

In the accompanying drawings—

Fig. 3 is a plan view of the screen shown in Fig. 1, the same being on an slightly enlarged scale;

Fig. 4 is a sectional view through Fig. 3 approximately on the line 4—4;

Fig. 5 is a transverse sectional view through Fig. 3 approximately on the line 5—5, the same being on an appreciably enlarged scale;

Fig. 6 is a fragmentary sectional view through Fig. 5 approximately on the line 6—6;

Fig. 7 is a perspective view of a portion of one of the screen bars shown in Fig. 3, the same being on an enlarged scale;

Fig. 8 is a top plan view of the right-hand portions of the screen shown in Fig. 5, two of the bars being shown in section for illustrating the spacing members;

Fig. 9 is an enlarged sectional view through one of the screen bars shown in Fig. 5, the same being on an enlarged scale and illustrating the angle of the surface of the overhanging edge part of the bar;

Fig. 10 is a fragmentary sectional view showing a pair of ears pressed from one of the bars shown in Fig. 1, the same being on an enlarged scale;

Fig. 11 shows the same structure with the ears pressed back in position;

Fig. 12 is an elevation of the structure shown in Fig. 11;

Fig. 13 is a view similar to Fig. 10 but showing the ears spread somewhat;

Fig. 14 is a view similar to Fig. 13 but showing the ears bent back to the desired extent to secure the spacing shown in Fig. 8;

Fig. 15 is a perspective view similar to Fig. 7 but showing a modified form of the invention.

Figure 1:
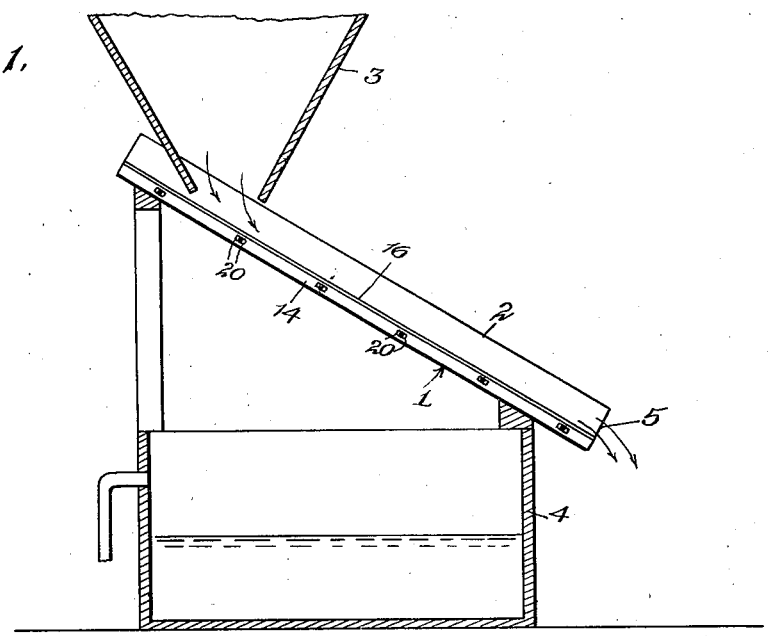
Fig. 1 is a view partly in vertical section illustrating a screen embodying the invention and certain associated members which act as feed members and receptive tanks respectively.
Figure 2:
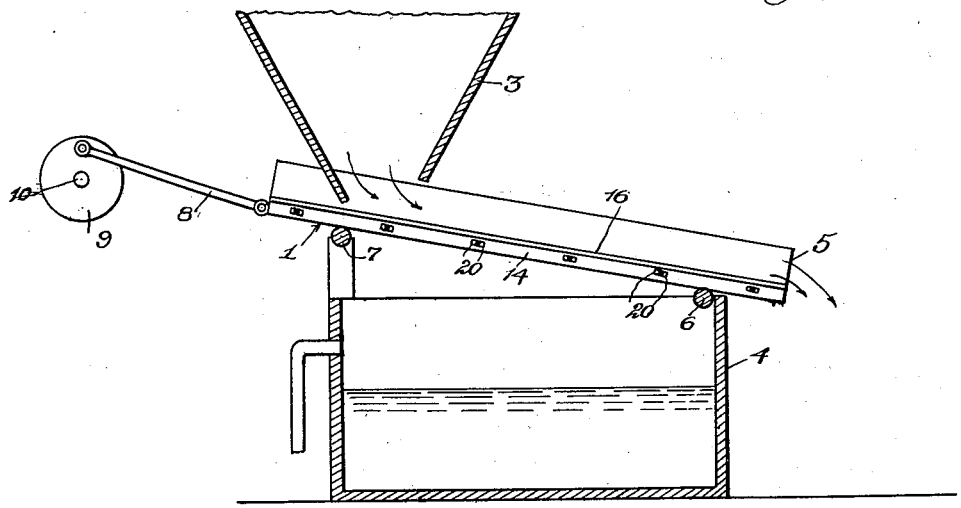
Fig. 2 is a view similar to Fig. 1 but showing a screen mounted to be reciprocated during the screening action.

Referring to the accompanying drawings by numerals, 1 indicates the screen which may be provided with side boards or guards 2 if desired so that material placed thereon cannot move off the screen laterally. As shown in Fig. 1, a hopper 3 is positioned to supply the material to be screened and this material moves by gravity along substantially the full length of the screen 1. The finer material passes through the screen and drops into a container 4, while the coarser material passes out the end 5. It will be understood that any desired material may be screened. As an instance, coal that has been washed could be screened to remove water and also fine dust. When the coal is placed in the hopper 3, it moves on to the screen 1 and as it passes along the screen 1 water and dust will drop through the screen into container 4 while the larger particles will pass out end 5. Granular material may be screened in the same way if desired. Under some circumstances the material to be cleaned may clog, and when this is the case the screen 1 is agitated or moved back and forth quickly. As shown in Fig. 2, the hopper 3 is arranged substantially as shown in Fig. 1 and the container 4 also is arranged in the same manner. However, rollers 6 and 7 act as supports for the screen 1 and this screen is moved back and forth by a link 8 connected to a disk 9 actuated by a shaft 10, which shaft may be rotated by an electric motor or other power means. As the material passes from the hopper 3 on to the screen, as shown in Fig. 2, the quick back-and-forth movement of the screen will break up any ordinary lumps and will permit the finer material, either water or fine solid matter, to pass downwardly into the container 4, while the coarser material will pass out the end 5.

It will be understood that the openings in the screen may vary if desired. The screen structure is intended to screen fine material and, therefore, is usually provided with openings from .001" to .01", though other size openings may be provided if desired.

In Figs. 3 to 14, inclusive, the detail structure of the screen 1 is disclosed. Referring to these figures it will be seen that there are a number of screen bars 11. Screen 1 may be provided with stiff side bars 12 and 13, as shown in Fig. 3, though these are not necessary in many instances. The bars 11 are preferably made of metal and are each first constructed, as shown in Fig. 9, namely, with the body 14 substantially rectangular in cross section. This body, at one edge, is provided with an overhanging part or edge portion 15 provided with an inclined face 16. The face 16 is inclined from a plane parallel to the plane of the body 14 so as to provide a clearance in the respective openings 17, as shown in Fig. 5. Also by providing this overhanging edge portion or bead 15, a clearance space 18 is provided so that any material passing through the openings 17 may easily drop downwardly away from the screen and thereby not clog any parts thereof. Preferably the metal is cut at 21 and then the respective ears 20 are pressed from the position shown in Fig. 12 to that shown in Fig. 10. During this pressing action, the metal is sheared along the respective lines 21 and 22 so as to leave an opening 23 through which the various clamping members 24 are adapted to extend. These clamping members are rivets, as shown in Fig. 8, though bolts may be used without departing from the spirit of the invention. In pressing out the ears 20, it is necessary to bend the same upright, as shown in Fig. 10, in order to secure complete ear formation. The ears are then flared or bent apart as shown in Fig. 13. After this has been done the bar is placed in a press and the ears pressed downwardly to the position shown in Fig. 14, or even closer to the body 14 of the bar, according to the amount of clearance or opening which may be desired.

In Fig. 8 is shown a certain opening or spacing 17. If a less opening were desired, the ears 20 would be pressed inwardly to a greater extent, and if a greater opening were desired the ears would be bent down to a less extent. The position of the ears 20 in respect to the body 14 of the respective bars 11 is fixed by the press and not by the rivets 24. These rivets merely hold the parts tightly together in their assembled relation, as shown in Fig. 3. By forming each bar with an overhanging part 15, there is provided a working surface 25 on which the material is deposited when in actual use, as shown in Figs. 1 and 2. All material deposited on the screen must either pass out the end 5 or pass through the openings 17. It will be evident, of course, that the screen may be of any desired size including any width and any length.

As indicated particularly in Fig. 4, there is a row of ears 20 at spaced points along the bar and an opening 23 between each pair of ears for accommodating a bolt or rivet which will act as clamping means for securing the parts together in their assembled relation.

In Fig. 15 a slightly modified structure is provided wherein the overhanging part or bead 15' is bent over rather than rolled or formed as shown in Fig. 9. In this form of the invention the surface 16' is the same as surface 16. The working surface 25 may be flat or round as preferred. The openings 23 are spaced the same distance apart in all the bars so that the bars 11 will all line up as shown in Fig. 2 and the clamping members 24 provide desired clamping members and also supporting members for the respective bars.

I claim:

1. A screen including a plurality of substantially parallel bars, each bar having a row of pressed-out ears functioning as spacing members, each of said bars having an opening formed therein by reason of said ears being pressed out and clamping bars extending through the openings in said bars for holding the bars in assembled relation.

2. A screen including a plurality of substantially parallel bars, and clamping members extending through all said bars for holding them in assembled relation, each of said bars being substantially rectangular in cross section, each bar along the upper longitudinal edge having a laterally extending bead having its side surface inclined with respect to the plane of the bar of which it is a part to provide clearance for the material being screened, each of said bars having openings for receiving said clamping members, the material from said bars to provide said openings presenting spacing ears for spacing said bars apart.

ALBERT R. LAUBENSTEIN.